United States Patent
Zhang et al.

(10) Patent No.: US 11,149,095 B2
(45) Date of Patent: Oct. 19, 2021

(54) CELLULOSE II NANOCRYSTAL PARTICLES AND PREPARATION METHOD AND USE THEREOF

(71) Applicant: Institute of Metal Research Chinese Academy of Sciences, Liaoning (CN)

(72) Inventors: Jinsong Zhang, Liaoning (CN); Yukun Yan, Liaoning (CN); Yangtao Zhou, Liaoning (CN); Zhiyu Liu, Liaoning (CN)

(73) Assignee: Institute of Metal Research Chinese Academy of Sciences, Liaoning (CN)

( * ) Notice: Subject to any disclaimer, the term of this patent is extended or adjusted under 35 U.S.C. 154(b) by 0 days.

(21) Appl. No.: 16/475,921

(22) PCT Filed: Dec. 27, 2017

(86) PCT No.: PCT/CN2017/118915
§ 371 (c)(1),
(2) Date: Jul. 3, 2019

(87) PCT Pub. No.: WO2018/126959
PCT Pub. Date: Jul. 12, 2018

(65) Prior Publication Data
US 2019/0330378 A1   Oct. 31, 2019

(30) Foreign Application Priority Data

Jan. 3, 2017 (CN) .......................... 201710000911.8
Sep. 6, 2017 (CN) .......................... 201710794872.3

(51) Int. Cl.
*C08B 1/00* (2006.01)
*C08L 1/04* (2006.01)
*C08L 1/00* (2006.01)
*C08L 1/06* (2006.01)
*C08L 1/02* (2006.01)
*C08B 15/02* (2006.01)
*B01J 31/06* (2006.01)
*B01J 35/02* (2006.01)

(52) U.S. Cl.
CPC .............. *C08B 1/003* (2013.01); *B01J 31/06* (2013.01); *B01J 35/023* (2013.01); *C08B 15/02* (2013.01); *C08L 1/00* (2013.01); *C08L 1/02* (2013.01); *C08L 1/04* (2013.01); *C08L 1/06* (2013.01)

(58) Field of Classification Search
None
See application file for complete search history.

(56) References Cited

U.S. PATENT DOCUMENTS

| 5,543,511 A * | 8/1996 | Bergfeld ................. C08B 15/02 536/124 |
| 10,611,891 B2 * | 4/2020 | Hu ......................... C08J 11/105 |
| 2002/0061335 A1 * | 5/2002 | Kumar .................... C08B 15/02 424/488 |

FOREIGN PATENT DOCUMENTS

| CN | 1369508 A | 9/2002 |
| CN | 105713100 A | 6/2016 |
| CN | 105754308 A | 7/2016 |
| JP | 1999-171901 | 6/1999 |
| WO | WO 2015/074120 A1 | 5/2015 |

OTHER PUBLICATIONS

Jin et al., "On the polymorphic and morphological changes of cellulosenanocrystals (CNC-I) upon mercerization and conversion to CNC-II" Carbohydrate Polymers vol. 143 pp. 327-335 (Year: 2016).*
Sebe et al., "Supramolecular Structure Characterization of Cellulose II Nanowhiskers Produced by Acid Hydrolysis of Cellulose I Substrates" Biomacromolecules vol. 13 pp. 570-578 (Year: 2012).*
Iyer et al., "Crystallization of Amorphous Cellulose" Textile research Journal Nov. 1984, pp. 732-735 (Year: 1984).*
Nelson et al., "Determination of the Leveling-Off Degree of Polymerization of Cotton and Rayon" Journal of Polymer Science vol. x No. 6 pp. 577-586 (Year: 1952).*
International Search Report received in PCT Application No. PCT/CN2017/118915, dated Apr. 3, 2018.
Written Opinion received in PCT Application No. PCT/CN2017/118915, dated Apr. 3, 2018.
Office Action in Japanese Application No. 2019-556409, dated Aug. 4, 2020.

* cited by examiner

*Primary Examiner* — Eric Olson
(74) *Attorney, Agent, or Firm* — Knobbe, Martens, Olson & Bear LLP (57) ABSTRACT

Cellulose II nanocrystal particles have a crystallinity ≥80%, a number-average molecular weight ranging from 1200 to 2500, and a molecular weight distribution coefficient Mw/Mn≤1.30. The cellulose II nanocrystal particles can be prepared by: subjecting a cellulose raw material to an amorphization reconstitution and then to a crystallization acidolysis. The crystallization acidolysis may be carried out under a low concentration acidic condition. The method enables high efficient and clean production and quality control of cellulose nanocrystal materials.

20 Claims, 5 Drawing Sheets

CELLULOSE II NANOCRYSTAL PARTICLES AND PREPARATION METHOD AND USE THEREOF

CROSS REFERENCE TO RELATED APPLICATIONS

This application is the U.S. National Phase under 35 U.S.C. § 371 of International Application No. PCT/CN2017/118915 filed Dec. 27, 2017, designating the U.S. and published as WO 2018/126959 on Jul. 12, 2018, which claims the benefit of Chinese Application No. 201710000911.8 filed Jan. 3, 2017 and Chinese Application No. 201710794872.3 filed Sep. 6, 2017.

TECHNICAL FIELD

The present disclosure relates to the technical field of cellulose nanocrystal, and particularly to cellulose II nanocrystal particles and a preparation method and use thereof.

BACKGROUND

Cellulose nanocrystals are advanced cellulose-based materials which have been widely researched in recent decades. Cellulose nanocrystals have unique physical, chemical and biological properties such as biodegradability, biocompatibility, high specific surface area, high specific strength, high specific modulus, highly controllable structure and morphology, and modifiable surface, and have a wide application prospect in the fields of material, light industry, chemical industry, food, pharmaceutical, health care, environmental protection, information, energy resources and so on.

At present, cellulose nanocrystals have two kinds of crystal structures. One kind is cellulose I, and the other kind is cellulose II. Existing cellulose II nanocrystals are mainly prepared by the following three methods. Method I: a cellulose raw material is subjected to a mercerization treatment and then to an acid-catalyzed hydrolysis to obtain spherical cellulose II nanocrystals with a diameter of from 50 nm to 200 nm. Method II: cellulose I nanocrystals are firstly obtained by an acid hydrolysis process and then the cellulose I nanocrystals are treated with a sodium hydroxide solution to obtain rod-shaped or needle-shaped cellulose II nanocrystals with a width greater than 10 nm and a length greater than 200 nm. Method III: concentrated sulfuric acid is dropwise added to an aqueous dispersion of cellulose slowly under an ice bath condition, and then the mixture is heated to obtain a clear hydrolysate, and the hydrolysate is washed with clear water to precipitate crystals from hydrolyzed cellulose to obtain rod-shaped cellulose II nanocrystals with a width of from 5 nm to 10 nm and a length greater than 100 nm. The former two methods are extraction methods in nature, whereas the third method involves crystallization reconstitution of small molecule cellulose after degradation of cellulose raw material in nature. The above three methods for preparing cellulose II nanocrystals have the following drawbacks.

First, during the degradation of cellulose raw material, high concentration and high ratio (mass ratio of acid solution to cellulose raw material) sulfuric acid or hydrochloric acid must be used. When sulfuric acid is used, the concentration of the acid solution is as high as 65%, the mass ratio of cellulose to acid solution is from 1:8 to 1:20, and the hydrolysis reaction temperature is 45° C. When hydrochloric acid is used, the concentration of hydrochloric acid is 2.5 to 6 mol/L, the mass ratio of cellulose to acid solution is from 1:20 to 1:60, and the hydrolysis reaction temperature is from 70 to 110° C. The use of high ratio and high concentration strong acid not only causes severe equipment corrosion, but also produces a large amount of industrial wastewater requiring harmless treatment—with respect to each part by mass of nanocrystals obtained, hundreds, thousands or even more than ten thousand times parts by mass of industrial wastewater will be produced, and high cost required for harmless treatment of these industrial wastewater becomes an important reason for which the existing production cost of cellulose nanocrystals is excessively high.

Second, it is difficult to control the surface property of cellulose nanocrystals. Surface property is a key indicator for characterizing the quality of cellulose nanocrystals, and the controllability of surface property is very important for use in composite and development of various functionalized derivatives. Various test results indicate that rod-shaped, needle-shaped, whisker-shaped or spherical cellulose nanocrystals obtained by existing preparation methods are not complete monocrystals, but have a polycrystal structure formed with a blend of several micro cellulose crystals and amorphous cellulose and with a number of crystal defects inside. For such a polycrystal structure, even though the control of size and aspect ratio of cellulose nanocrystals can be achieved by precisely controlling operational conditions such as material proportion, temperature, acidity and time, it is impossible to accurately control crystallinity and crystal defect of product, thereby inevitably leading to uncontrollability of nanocrystal surface property.

It has been nearly 70 years since cellulose nanocrystals came out, and cellulose nanocrystals exhibit an exciting application prospect. However, the application of cellulose nanocrystals still stays at research level nowadays because of confronting with double challenges of production cost and product quality.

SUMMARY

The object of the present disclosure is to provide cellulose II nanocrystal particles, preparation method and use thereof. The cellulose II nanocrystal particles of the present disclosure have advantages of high crystallinity, low molecular weight, narrow molecular weight distribution, narrow size distribution, definite surface configuration, and high surface chemistry modification potential, and can be used for applications such as catalyst support and composite material reinforcement phase.

Inventive Concept of the Present Disclosure

In order to solve the above-mentioned two technical problems in the art, the inventors propose a novel idea for preparing cellulose II nanocrystal particles by making use of characteristics of amorphous cellulose with a loose structure, such as being liable to hydrolysis, definite monocrystal surface structure and easy controlling, in combination with regulation effect of organic solvent on crystallization behavior of polysaccharide molecule, that is, a cellulose raw material is firstly subjected to an amorphization reconstitution and then to a crystallization acidolysis, thereby enabling an efficient and clean production and quality control of cellulose nanocrystal material.

Technical Solutions of the Present Disclosure

In a first aspect, the present disclosure provides cellulose II nanocrystal particles having a crystallinity≥80%, a number-average molecular weight ranging from 1200 to 2500, and a molecular weight distribution coefficient Mw/Mn≤1.30.

In a preferred embodiment of the cellulose II nanocrystal particles, the cellulose II nanocrystal particles have a molecular weight distribution coefficient Mw/Mn≤1.20.

In a preferred embodiment of the cellulose II nanocrystal particles, the cellulose II nanocrystal particles have a molecular weight distribution coefficient Mw/Mn≤1.10.

In a preferred embodiment of the cellulose II nanocrystal particles, the cellulose II nanocrystal particles have a number-average molecular weight of from 1500 to 2200.

In a preferred embodiment of the cellulose II nanocrystal particles, the cellulose II nanocrystal particles have a number-average molecular weight of from 1600 to 2000.

In a preferred embodiment of the cellulose II nanocrystal particles, the cellulose II nanocrystal particles have cell parameters of a=8.1 Å, b=9.03 Å, c=10.31 Å, α=β=90°, and γ=117.1°.

In a preferred embodiment of the cellulose II nanocrystal particles, an outer surface of the cellulose II nanocrystal particles which is composed of cellulose chain ends is a crystal plane perpendicular to a (001) zone axis, or a crystal plane perpendicular to a (112) zone axis, wherein a length and a width of the outer surface define a length L and a width W of the cellulose II nanocrystal particles, and a size perpendicular to the outer surface defines a height H of the cellulose II nanocrystal particles.

In a preferred embodiment of the cellulose II nanocrystal particles, the aldose activity is present on the crystal plane perpendicular to the (001) zone axis or the crystal plane perpendicular to the (112) zone axis composed of the cellulose chain ends.

In a preferred embodiment of the cellulose II nanocrystal particles, the outer surface of the cellulose II nanocrystal particles which is composed of cellulose chain ends is the crystal plane perpendicular to the (112) zone axis, wherein each of the length L and the width W of the cellulose II nanocrystal particles is between 3 nm and 20 nm, and the height H is between 3 nm and 10 nm.

In a preferred embodiment of the cellulose II nanocrystal particles, the outer surface of the cellulose II nanocrystal particles which is composed of cellulose chain ends is the crystal plane perpendicular to the (001) zone axis, wherein each of the length L and the width W of the cellulose II nanocrystal particles is between 15 nm and 200 nm, and the height H is between 2 nm and 10 nm.

In a preferred embodiment of the cellulose II nanocrystal particles, each of the length L and the width W of the cellulose II nanocrystal particles is between 3 nm and 15 nm, and the height H is between 3 nm and 8 nm.

In a preferred embodiment of the cellulose II nanocrystal particles, each of the length L and the width W of the cellulose II nanocrystal particles is between 3 nm and 10 nm, and the height H is between 3 nm and 6 nm.

In a preferred embodiment of the cellulose II nanocrystal particles, the cellulose II nanocrystal particles have a crystallinity≥90%.

In a preferred embodiment of the cellulose II nanocrystal particles, the cellulose II nanocrystal particles have a crystallinity≥95%.

In a preferred embodiment of the cellulose II nanocrystal particles, the yield of the cellulose II nanocrystal particles is higher than 80% based on the total weight of the cellulose raw material.

In a preferred embodiment of the cellulose II nanocrystal particles, a yield of the cellulose II nanocrystal particles is higher than 90% based on the total weight of the cellulose raw material.

In a preferred embodiment of the cellulose II nanocrystal particles, the cellulose II nanocrystal particles are monocrystalline particles.

In a second aspect, the present disclosure provides a method for preparing the cellulose II nanocrystal particles of the first aspect of the present disclosure, comprising:

Step 1: dissolving a cellulose-containing raw material in a solvent to obtain a cellulose solution, and mixing the cellulose solution with a poor solvent to precipitate the dissolved cellulose from the poor solvent so as to obtain amorphization reconstituted cellulose; and Step 2: adding the amorphization reconstituted cellulose obtained in Step 1 to a mixed solution of water/organic solvent, adding an inorganic acid to adjust acidity to allow the preparation to be carried out under a low concentration acidic condition, and heating the solution to carry out a reaction, so as to obtain the cellulose II nanocrystal particles.

In a preferred embodiment of the method, in Step 1, the cellulose-containing raw material is a refined cellulose or cellulose slurry isolated from plants, animals, algae or bacteria.

In a preferred embodiment of the method, in Step 1, the solvent for dissolving the cellulose-containing raw material is one or more selected from the group consisting of sodium hydroxide/urea/water, lithium hydroxide/urea/water, sodium hydroxide/thiourea/water, lithium hydroxide/thiourea/water, N-methylmorpholine-N-oxide/water, N,N-dimethyl acetamide/LiCl, and N,N-dimethyl formamide/LiBr.

In a preferred embodiment of the method, in Step 1, the poor solvent is one or more selected from the group consisting of water, alcohols, ketones, esters, ethers, aromatic hydrocarbons, and alkanes solvents.

In a preferred embodiment of the method, in Step 1, the poor solvent is one or more selected from the group consisting of water, alcohols, and ketones.

In a preferred embodiment of the method, in Step 1, the poor solvent is one or more selected from the group consisting of methanol, ethanol, n-propanol, isopropanol, sec-butanol, tert-butanol, ethylene glycol, glycerol, and acetone.

In a preferred embodiment of the method, in Step 2, the organic solvent is one or more selected from the group consisting of alcohols, ethers, ketones, esters, N,N-dimethyl formamide, N,N-dimethyl acetamide, and dimethyl sulfoxide.

In a preferred embodiment of the method, in Step 2, the organic solvent is one or more selected from the group consisting of methanol, ethanol, isopropanol, isobutanol, sec-butanol, tert-butanol, ethylene glycol, glycerol, and acetone.

In a preferred embodiment of the method, in Step 2, the organic solvent is tetrahydrofuran and/or 1,4-dioxane.

In a preferred embodiment of the method, the organic solvent is acetone and/or ethyl acetate.

In a preferred embodiment of the method, in Step 2, the inorganic acid is one or more selected from the group consisting of hydrochloric acid, sulfuric acid, phosphoric acid, perchloric acid, and hydrobromic acid.

In a preferred embodiment of the method, in Step 2, concentration of the inorganic acid is 0.01-5 mol/L.

In a preferred embodiment of the method, in Step 2, the concentration of the inorganic acid is 0.1-2 mol/L.

In a preferred embodiment of the method, the cellulose II nanocrystal particles obtained in Step 2 are washed and then stored in wet state.

In a third aspect, the present disclosure provides use of the cellulose II nanocrystal particles of the first aspect of the present disclosure or the cellulose II nanocrystal particles prepared by the method of the second aspect of the present disclosure as a catalyst support, a composite material reinforcement phase, or so on.

Technical Effects of the Present Disclosure

1. The present disclosure at least partially achieves the following technical effects by using the above technical solutions. First, in the method of the present disclosure, a cellulose raw material is firstly subjected to an amorphization reconstitution to convert it to structurally loose and easily degradable amorphous cellulose, and then subjected to an acid-catalyzed crystallization degradation. This greatly reduces the difficulty in degradation, and thus eliminates the strong dependence on high concentration and high ratio strong acid in the existing art, such that the degradation process can be carried out under a low concentration acidic condition, and the amount of strong acid used can be greatly reduced, thereby solving the cost problem due to equipment corrosion caused by high concentration strong acid and treatment on a large amount of waste water. Second, by making use of the regulation effect of organic solvent on crystallization behavior of polysaccharide molecule, cellulose II nanocrystal particles with high crystallinity, definite surface configuration and controllable property can be obtained, while at least in some embodiments, excessive degradation of cellulose can be avoided, achieving a high yield as high as 90% or more.

2. Besides, in some preferred embodiments, the present disclosure also achieves the following two unexpected effects. First, the cellulose II nanocrystal particle product prepared in the present disclosure has a highly complete crystal structure, such that atomic image structure of cellulose crystals can be clearly observed under HRTEM, which has great significance in precisely describing surface configuration of cellulose nanocrystal particles and developing derivative applications based on surface properties. Second, the inventors find that the cellulose II nanocrystal particles prepared in the present disclosure not only have a large amount of active hydroxy groups on their exposed surfaces, but also have a large amount of highly active aldose groups on specific exposed surfaces composed of cellulose chain ends, whereas conventional cellulose nanocrystals only have active hydroxy functional groups on their surfaces. This new structure having two kinds of active functional groups provides more flexibility and possibility for expanding subsequent applications of cellulose nanocrystal products.

3. The cellulose II nanocrystal particles, mainly characterized in high crystallinity, low molecular weight, narrow molecular weight distribution, narrow size distribution, definite surface configuration, high surface chemistry modification potential and so on, are successfully prepared with the technical solutions provided in the present disclosure.

DETAILED DESCRIPTION

The present disclosure will be specifically described below by way of particular embodiments. However, these particular embodiments do not limit the protection scope of the present disclosure in any manner. Raw materials used in the embodiments are known compounds and are commercially available in the market.

1. Preparation Method of Cellulose II Nanocrystal Particles

Cellulose-Containing Raw Material

In the present disclosure, "cellulose-containing material" or "cellulose raw material" may be a material containing cellulose in any physical state, and is preferably a refined cellulose or cellulose slurry isolated from plants, animals, algae or bacteria, and more preferably a refined cellulose or cellulose slurry derived from plants. In the present disclosure, "plants", "animals", "algae" and "bacteria" have common meanings in the art. For example, plants may include Bryophytes, Pteridophytes, Spermatophytes and so on, such as trees, bamboo, cotton, grasses, hemp and so on.

In the present disclosure, "refined cellulose" refers to a cellulose-containing material with increased content of cellulose obtained by pretreating a cellulose raw material. The pretreatment or refinement of the cellulose raw material may be performed by well-known technique in the art. For example, the most commonly used refining process for cellulose raw material is to subject a cellulose raw material (such as straw, bamboo and so on) to continuous reflux reaction through 5 wt % NaOH aqueous solution, 1 wt % HCl aqueous solution, and 1 wt % sodium hypochlorite aqueous solution sequentially.

In the present disclosure, "cellulose slurry" refers to a cellulose-containing raw material in a slurry form, such as paper pulp, bamboo pulp, cotton pulp, straw pulp, hemp pulp and so on, and preparation methods thereof are well-known in the art.

Step 1: Amorphization Reconstitution of a Cellulose Raw Material

In the present disclosure, "amorphization reconstitution" refers to a process for breaking original crystallization portion of a cellulose raw material so as to convert it to amorphization reconstituted cellulose with a loose structure.

In this process, the first step of the amorphization reconstitution is to dissolve the cellulose-containing raw material to obtain a cellulose solution. The solvent used may be any solvent for dissolving the cellulose-containing raw material in the art, and is preferably one or more selected from the group consisting of sodium hydroxide/urea/water, lithium hydroxide/urea/water, sodium hydroxide/thiourea/water, lithium hydroxide/thiourea/water, N-methylmorpholine-N-oxide/water, N,N-dimethyl acetamide/LiCl, and N,N-dimethyl formamide/LiBr.

After the dissolution, the cellulose solution is mixed with a poor solvent to precipitate the dissolved cellulose from the poor solvent so as to obtain amorphization reconstituted cellulose. The poor solvent may be any poor solvent capable of precipitating cellulose from the cellulose solution in the art, and is preferably one or more selected from the group consisting of water, alcohols, ketones, esters, ethers, aromatic hydrocarbons, and alkanes solvents, more preferably one or more selected from the group consisting of water, alcohols, and ketones, and even more preferably one or more selected from the group consisting of methanol, ethanol, n-propanol, isopropanol, sec-butanol, tert-butanol, ethylene glycol, glycerol, and acetone. Mixing the cellulose solution with the poor solvent may be performed by any liquid-liquid mixing method in the art, and may be realized by any enhanced mixing method (such as stirring), through adding the cellulose solution to the poor solvent or adding the poor solvent to the cellulose solution.

Furthermore, after the precipitation of the amorphization reconstituted cellulose, optionally, the amorphization reconstituted cellulose may be filtered off, washed with suitable washing liquid (such as methanol, ethanol, n-propanol and so on), and lyophilized to obtain amorphization reconstituted cellulose for use in subsequent process.

Step 2: Crystallization Acidolysis of the Amorphization Reconstituted Cellulose

In the present disclosure, "crystallization acidolysis" refers to a process for subjecting the amorphization reconstituted cellulose to an acid-catalyzed degradation reaction in a mixed solution system of an organic solvent and water to allow the recrystallization of the amorphization reconstituted cellulose to form cellulose nanocrystals during the degradation.

In this process, the amorphization reconstituted cellulose precipitated is added to a mixed solution of an organic solvent and water, then a suitable amount of inorganic acid is added to adjust acidity, and the solution is heated to a suitable temperature to perform an acid-catalyzed degradation reaction, so as to obtain a suspension containing the cellulose II nanocrystal particles of the present disclosure.

The selection on the organic solvent in the process is a conventional technical knowledge in the art. For example, the organic solvent is preferably one or more selected from the group consisting of alcohols, ethers, ketones, esters, N,N-dimethyl formamide, N,N-dimethyl acetamide, dimethyl sulfoxide, tetrahydrofuran, and 1,4-dioxane, and more preferably one or more selected from the group consisting of methanol, ethanol, isopropanol, isobutanol, sec-butanol, tert-butanol, ethylene glycol, glycerol, and acetone. In another embodiment, the organic solvent is selected from tetrahydrofuran or 1,4-dioxane. In another embodiment, the organic solvent is selected from acetone or ethyl acetate.

The selection on the inorganic acid in the process is also a conventional technical knowledge in the art. For example, the inorganic acid may be any inorganic acid capable of degrading cellulose, and is preferably one or more selected from the group consisting of hydrochloric acid, sulfuric acid, perchloric acid, and hydrobromic acid. The concentration of the inorganic acid used is not limited. Because the amorphous cellulose has a loose structure and is liable to degradation, a relatively mild process condition may be used in the process. For example, the concentration of the inorganic acid used in the process is preferably 0.01-5 mol/L, more preferably 0.05-3 mol/L, even more preferably 0.1-2 mol/L, and the most preferably 0.1-1 mol/L.

Furthermore, after obtaining the suspension containing the cellulose II nanocrystal particles of the present disclosure, optionally, the suspension may be neutralized with an alkaline, and the cellulose II nanocrystal particles may be separated therefrom by a solid-liquid separation method (such as membrane separation, centrifugation and so on), washed with deionized water, and then stored for long term in a wet state, with the dispersity remained.

In some embodiments, the yield in the method for preparing cellulose II nanocrystal particles according to the present disclosure is higher than 80%, and preferably 90% or more, with respect to the total amount of the cellulose raw material.

2. Cellulose II Nanocrystal Particles

The cellulose II nanocrystal particles according to the present disclosure have a crystallinity greater than 80%, preferably greater than 90%, more preferably greater than 95%, and even as high as 96%. In the present disclosure, the crystallinity is determined by a wide angle X-ray diffraction method in accordance with well-known analysis method in the art.

The cellulose II nanocrystal particles according to the present disclosure have a number-average molecular weight in a range from 1200 to 2500, preferably in a range from 1500 to 2200, and more preferably in a range from 1600 to 2000. The molecular weight distribution is very narrow, and the molecular weight distribution coefficient Mw/Mn is ≤1.30, preferably Mw/Mn≤1.20, and more preferably Mw/Mn≤1.10. In the present disclosure, the number-average molecular weight Mn, the weight average molecular weight Mw and the molecular weight distribution coefficient Mw/Mn are determined by the following method: the cellulose II nanocrystal particles obtained according to the present disclosure are converted to sodium carboxymethyl cellulose by the method described in "Preparation of carboxymethyl cellulose from bamboo shoot shell", Yang H E et al, *Chemical Industry and Engineering Progress*, 2013, Vol. 32, No. 10, the molecular weight of the sodium carboxymethyl cellulose is determined by Gel Exclusion Chromatography in aqueous phase with dextran as standard, and then the number-average molecular weight Mn, the weight average molecular weight Mw and the molecular weight distribution coefficient Mw/Mn are obtained from conventional calculation.

In some embodiments, through XRD diffraction determination, the cellulose II nanocrystal particles according to the present disclosure have the following cell parameters: a=8.1 Å, b=9.03 Å, c=10.31 Å, α=β=90°, and γ=117.1°.

In some embodiments, through high resolution TEM determination, the cellulose II nanocrystal particles according to the present disclosure comprise two kinds of particulate morphologies. As one kind of particles, an outer surface composed of cellulose chain ends is a crystal plane perpendicular to a (112) zone axis. The length and width of the outer surface define a length L and a width W of the cellulose II nanocrystal particles, and the size perpendicular to the outer surface defines a height H of the cellulose II nanocrystal particles. The length L and width W of this kind of particles are both between 3 nm and 20 nm, preferably between 3 nm and 15 nm, and more preferably between 3 nm and 10 nm. The height H is between 3 nm and 10 nm, preferably between 3 nm and 8 nm, and more preferably between 3 nm and 6 nm. As the other kind of particles, an outer surface composed of cellulose chain ends is a crystal plane perpendicular to a (001) zone axis. The length and width of the outer surface define a length L and a width W of the cellulose II nanocrystal particles, and the size perpendicular to the outer surface defines a height H of the cellulose II nanocrystal particles. The length L of this kind of particles is between 15 nm and 200 nm, preferably between 20 nm and 150 nm, and more preferably between 30 nm and 100 nm. The width W is between 15 nm and 200 nm, preferably between 20 nm and 150 nm, and more preferably between 30 nm and 100 nm. The height H is between 2 nm and 10 nm, preferably between 2 nm and 8 nm, and more preferably between 2 nm and 6 nm.

Furthermore, the inventors surprisingly find that, in some embodiments, on surfaces of the cellulose II nanocrystal particles according to the present disclosure, not only a large amount of active hydroxy groups are present on side chains of cellulose, but also a large amount of highly active aldose groups are present on a crystal plane perpendicular to the (001) zone axis or a crystal plane perpendicular to the (112) zone axis, said crystal plane being composed of cellulose chain ends. Although it is not supported by a complete theoretic explanation, the inventors believe that the presence of such large amount of highly active aldose groups at least partially is due to the integrity of the crystal surface of the nanocrystals prepared by the method of the present disclosure, and the presence of such active aldose groups will result in significantly improved activity of the surface functional groups. Also, this new structure having two kinds of active functional groups (hydroxyl groups and aldose groups) provides more flexibility and possibility for expanding subsequent applications of cellulose nanocrystal products. In the present disclosure, active aldose group refers to an aldose function group which can reduce silver-ammonia solution to silver atoms.

3. Use of Cellulose Nanocrystals

The cellulose nanocrystals of the present disclosure are used in a wide variety of applications in the fields of catalyst support, composite material reinforcement phase and so on, due to their high structure integrity and active surface chemistry properties.

The present disclosure will be further explained below by way of examples. All raw materials used in various examples are obtained from commercial sources.

Example 1

Step 1: Amorphization reconstitution of cellulose raw material: refined straw cellulose, obtained by subjecting straw to continuous reflux reaction through 5 wt % NaOH aqueous solution, 1 wt % HCl aqueous solution, and 1 wt % sodium hypochlorite aqueous solution sequentially, was used as a cellulose-containing raw material of the present disclosure. The cellulose-containing raw material was added to a solvent system composed of 8.3 wt % NaOH, 10 wt % urea and balance amount of water and stirred to obtain 50 g of 5 wt % straw cellulose solution. To this solution, ethanol was added with stirring until cellulose was completely precipitated, and the amorphization reconstituted cellulose precipitated was washed with ethanol and dried.

Step 2: Crystallization acidolysis of amorphization reconstituted cellulose: the amorphization reconstituted cellulose obtained in Step 1 was added to a mixed solution of water/ethanol/ethylene glycol. Hydrochloric acid was added to the solution to reach a concentration of hydrochloric acid of 0.1 mol/L. The solution was heated and refluxed for 10 hours to obtain a cellulose II nanocrystal particle product. With respect to the total amount of the cellulose raw material, the yield of the product was 90.3%.

Figure 1:
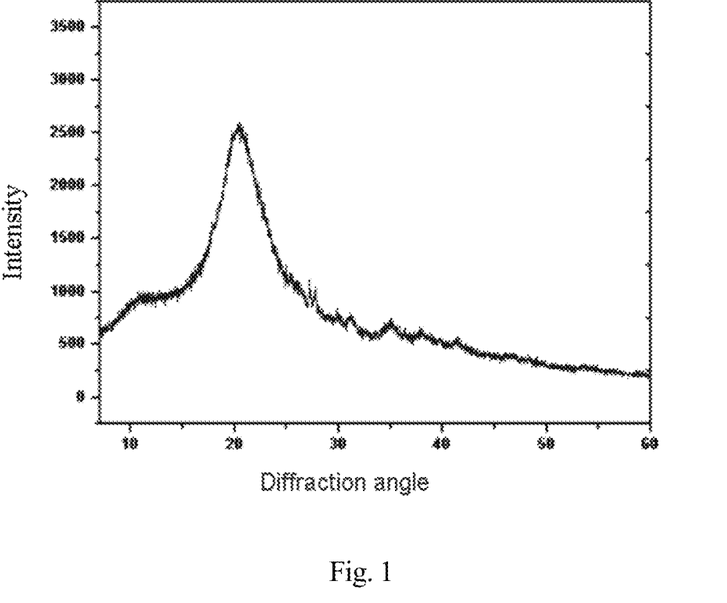
FIG. 1 is an XRD characterization spectrum of the amorphization reconstituted cellulose obtained in Step 1 of the method according to the present disclosure, in which the abscissa represents the diffraction angle 2θ (degree), and the ordinate represents the intensity (a. u.)

FIG. 1 shows an XRD characterization spectrum of the amorphization reconstituted cellulose obtained in Step 1. As calculated by Hall method, the crystallinity of the amorphization reconstituted cellulose after amorphization reconstitution is not higher than 5%.

Figure 2:
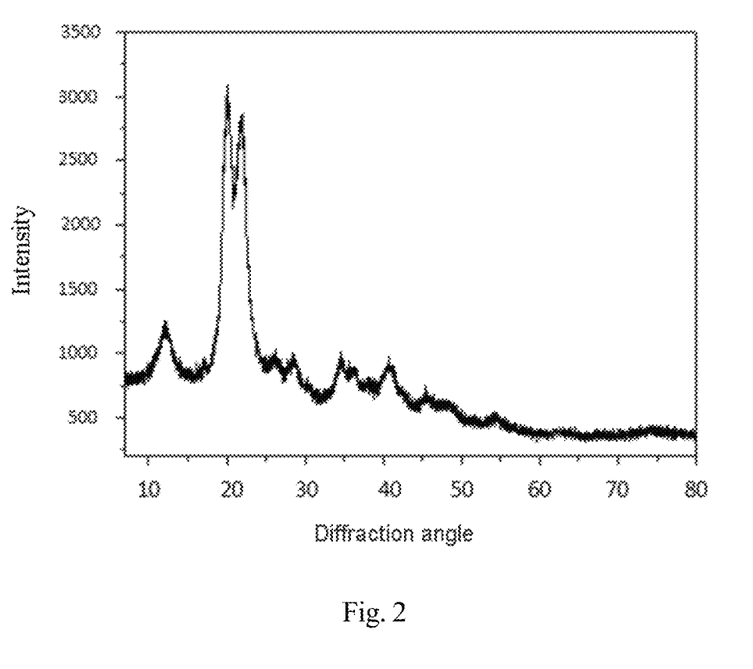
FIG. 2 is an XRD characterization spectrum of the cellulose II nanocrystal particles according to the present disclosure, in which the abscissa represents the diffraction angle 2θ (degree), and the ordinate represents the intensity (a. u.)

FIG. 2 shows an XRD characterization spectrum of the cellulose II nanocrystal particles obtained in this Example. As calculated by the Hall method, the crystallinity of the cellulose II nanocrystal particles is 94%. As calculated by fitting all crystallization peaks, the cell parameters of the cellulose II nanocrystal particles are as follows: a=8.1 Å, b=9.03 Å, c=10.31 Å, α=β=90°, and γ=117.1°.

Figure 3:
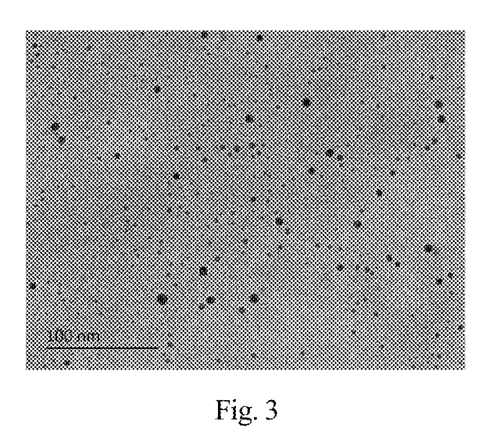
FIG. 3 is a TEM photograph of the cellulose II nanocrystal particles according to the present disclosure.
Figure 4:
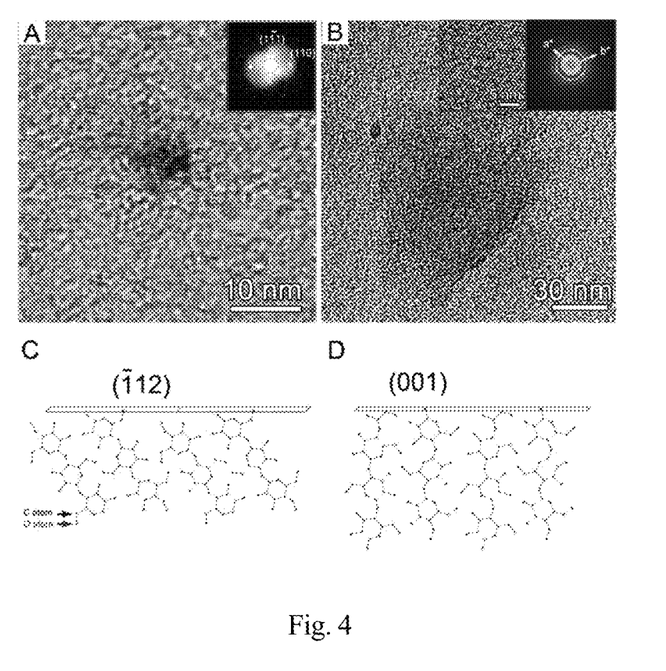
FIG. 4 is a partial enlarged view of the TEM photograph of the cellulose II nanocrystal particles as shown in FIG. 3, in which Fig. A is a photograph of highly dispersed cellulose II nanocrystal particles at a low magnification, Fig. B shows calculation for crystal plane parameters of exposed crystal planes of cellulose II nanocrystal particles under high resolution TEM and a simulation graph based on the calculation results; Fig. C is a high resolution TEM enlarged view of a cellulose II nanocrystal particle; and Fig. D is a high resolution TEM enlarged view of a cellulose II nanocrystal particle.
Figure 5:
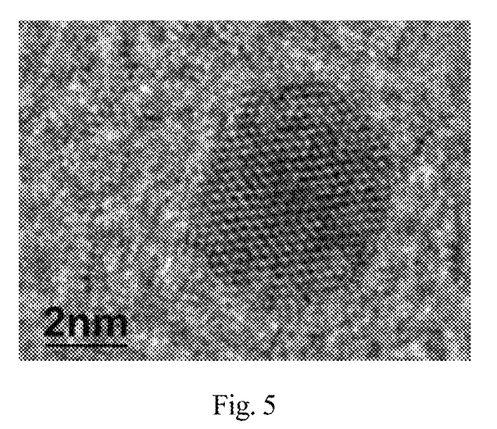
FIG. 5 is another partial enlarged view of the TEM photograph of the cellulose II nanocrystal particles as shown in FIG. 3.
Figure 6:
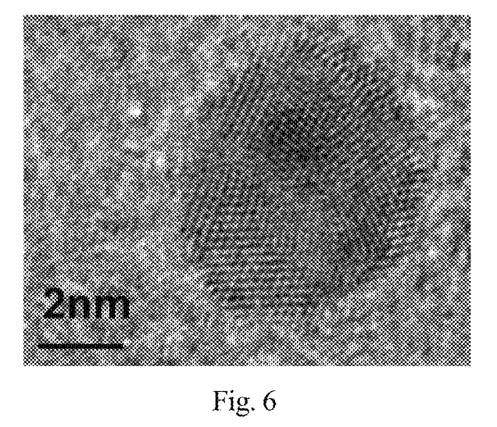
FIG. 6 is another partial enlarged view of the TEM photograph of the cellulose II nanocrystal particles as shown in FIG. 3.

FIGS. 3-8 show TEM photographs of the cellulose II nanocrystal particles. As shown in FIG. 3, the cellulose II nanocrystal particles have good dispersity. FIGS. 4-6 are several partial enlarged views taken from the TEM photograph of FIG. 3 respectively. As seen from the figures, there are particulate nanoparticles with a length and a width both between 3 nm and 10 nm and a height between 3 nm and 7 nm. After further analysis, an outer surface thereof composed of cellulose chain ends is a crystal plane perpendicular to a (112) zone axis.

Figure 7:
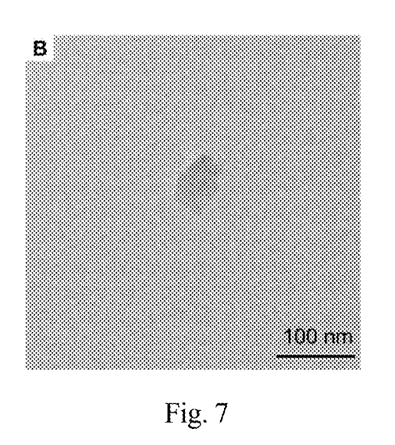
FIG. 7 is another TEM photograph of the cellulose II nanocrystal particles according to the present disclosure.
Figure 8:
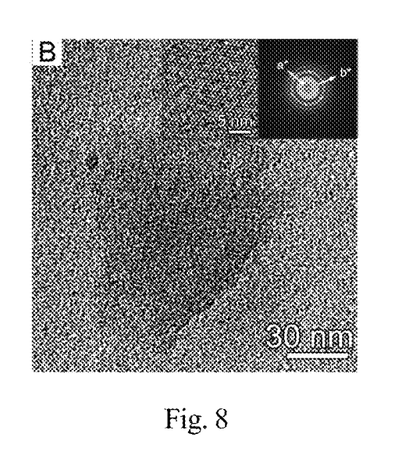
FIG. 8 is a partial enlarged view of the TEM photograph of the cellulose II nanocrystal particles as shown in FIG. 7.

FIG. 7 is another TEM photograph of the cellulose II nanocrystal particles. As seen from the figure, there are another kind of nanoparticles. From analysis of the enlarged view in FIG. 8, the nanoparticles are in a form of flat particles with a grain size between 50 nm and 100 nm in a length direction and in a width direction and between 2 nm and 8 nm in a thickness direction. After further analysis, an outer surface thereof composed of cellulose chain ends is a crystal plane perpendicular to a (001) zone axis.

Figure 9:
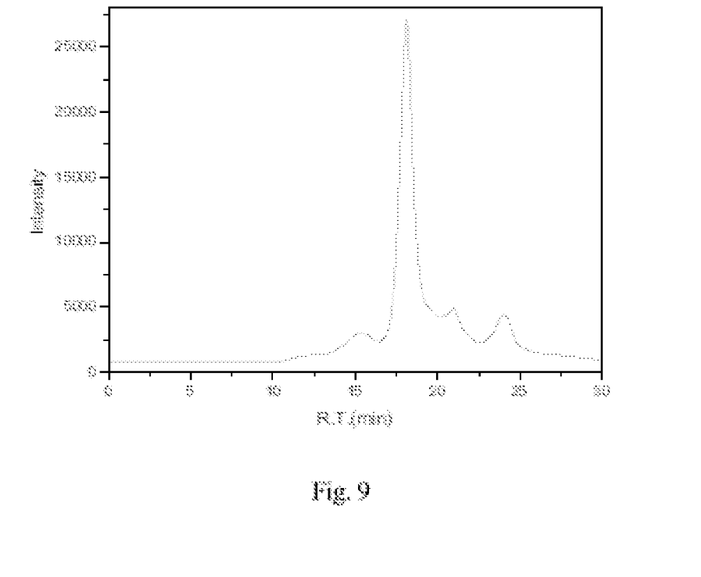
FIG. 9 is a GPC test graph of modified particles after carboxymethyl-modifying the cellulose II nanocrystal particles according to the present disclosure during determining the nanoparticles by a GPC method, in which the abscissa represents the retention time (R.T.) (min), and the ordinate represents the intensity (a. u.)

FIG. 9 shows a GPC test graph of modified particles after carboxymethyl-modification, during determining molecular weight by a GPC method. As seen from the calculation results, the cellulose II nanocrystal particles have a number-average molecular weight Mn of 1843, a weight average molecular weight Mw of 1974, and a molecular weight distribution coefficient PDI=Mw/Mn=1.07.

Figure 10:
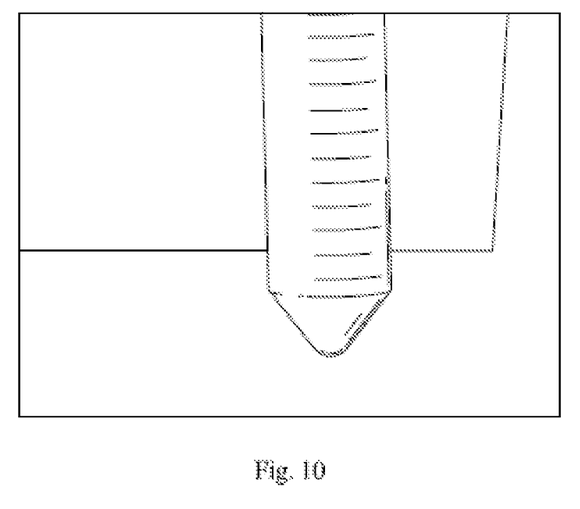
FIG. 10 is a photograph of a suspension of the cellulose II nanocrystal particles according to the present disclosure dispersed in water.

FIG. 10 shows a photograph of a suspension of the cellulose II nanocrystal particles dispersed in water. As seen from the figure, the nanoparticles are highly dispersed in water, and can be stored in a wet state for a long term and remain the dispersity.

Example 2

Step 1: Amorphization reconstitution of cellulose raw material: refined straw cellulose, obtained by subjecting straw to continuous reflux reaction through 5 wt % NaOH aqueous solution, 1 wt % HCl aqueous solution, and 1 wt % sodium hypochlorite aqueous solution sequentially, was used as a cellulose-containing raw material of the present disclosure. The cellulose-containing raw material was added to a solvent system composed of 8.3 wt % NaOH, 10 wt % urea and balance amount of water and stirred to obtain 50 g of 5 wt % straw cellulose solution. Methanol was added with stirring until cellulose was completely precipitated, and the amorphization reconstituted cellulose precipitated was washed with methanol and dried.

Step 2: Crystallization acidolysis of amorphization reconstituted cellulose: the amorphization reconstituted cellulose obtained in Step 1 was added to a mixed solution of water/tetrahydrofuran. Sulfuric acid was added to the solution to reach a concentration of sulfuric acid of 1 mol/L. The solution was heated and refluxed for 4 hours to obtain a cellulose II nanocrystal particle product.

With respect to the total amount of the cellulose raw material, the yield of the product was 81.7%. The product had a crystallinity of 87%, a number-average molecular weight of 2133, a molecular weight distribution coefficient Mw/Mn of 1.18, and cell parameters of a=8.1 Å, b=9.03 Å, c=10.31 Å, $\alpha=\beta=90°$, and $\gamma=117.1°$. The morphologies thereof included two kinds of particulate morphologies, in which one kind of particles, an outer surface thereof composed of cellulose chain ends being a crystal plane perpendicular to a (112) zone axis, had a length L and a width W both between 3 and 10 nm and a height between 3 and 6 nm, and the other kind of particles, an outer surface composed of cellulose chain ends being a crystal plane perpendicular to a (001) zone axis, had a length L between 20 nm and 100 nm, a width W between 30 nm and 80 nm and a height H between 3 nm and 8 nm.

Example 3

Step 1: Amorphization reconstitution of cellulose raw material: refined straw cellulose, obtained by subjecting straw to continuous reflux reaction through 5 wt % NaOH aqueous solution, 1 wt % HCl aqueous solution, and 1 wt % sodium hypochlorite aqueous solution sequentially, was used as a cellulose-containing raw material of the present disclosure. The cellulose-containing raw material was added to a solvent system composed of 8.3 wt % NaOH, 10 wt % urea and balance amount of water and stirred to obtain 50 g of 5 wt % straw cellulose solution. Propanol was added with stirring until cellulose was completely precipitated, and the amorphization reconstituted cellulose precipitated was washed with propanol and dried.

Step 2: Crystallization acidolysis of amorphization reconstituted cellulose: the amorphization reconstituted cellulose obtained in Step 1 was added to a mixed solution of water/propanol/glycerol. Phosphoric acid was added to the solution to reach a concentration of phosphoric acid of 2 mol/L. The solution was heated and refluxed for 6 hours to obtain a cellulose II nanocrystal particle product.

With respect to the total amount of the cellulose raw material, the yield of the product was 92.0%. The product had a crystallinity of 93%, a number-average molecular weight of 2015, a molecular weight distribution coefficient Mw/Mn of 1.12, and cell parameters of a=8.1 Å, b=9.03 Å, c=10.31 Å, $\alpha=\beta=90°$, and $\gamma=117.1°$. The morphologies thereof included two kinds of particulate morphologies, in which one kind of particles, an outer surface thereof composed of cellulose chain ends being a crystal plane perpendicular to a (112) zone axis, had a length L and a width W both between 3 and 10 nm and a height between 3 and 6 nm, and the other kind of particles, an outer surface thereof composed of cellulose chain ends being a crystal plane perpendicular to a (001) zone axis, had a length L between 20 nm and 80 nm, a width W between 30 nm and 80 nm and a height H between 5 nm and 10 nm.

Example 4

Step 1: Amorphization reconstitution of cellulose raw material: refined straw cellulose, obtained by subjecting straw to continuous reflux reaction through 5 wt % NaOH aqueous solution, 1 wt % HCl aqueous solution, and 1 wt % sodium hypochlorite aqueous solution sequentially, was used as a cellulose-containing raw material of the present disclosure. The cellulose-containing raw material was added to a solvent system composed of 8.3 wt % NaOH, 10 wt % urea and balance amount of water and stirred to obtain 50 g of 5 wt % straw cellulose solution. Isopropanol was added with stirring until cellulose was completely precipitated, and the amorphization reconstituted cellulose precipitated was washed with isopropanol and dried.

Step 2: Crystallization acidolysis of amorphization reconstituted cellulose: the amorphization reconstituted cellulose obtained in Step 1 was added to a mixed solution of water/isopropanol/propanediol. Hydrobromic acid was added to the solution to reach a concentration of hydrobromic acid of 0.5 mol/L. The solution was heated and refluxed for 7 hours to obtain a cellulose II nanocrystal particle product.

With respect to the total amount of the cellulose raw material, the yield of the product was 87.3%. The product had a crystallinity of 94%, a number-average molecular weight of 1579, a molecular weight distribution coefficient Mw/Mn of 1.08, and cell parameters of a=8.1 Å, b=9.03 Å, c=10.31 Å, $\alpha=\beta=90°$, and $\gamma=117.1°$. The morphologies thereof included two kinds of particulate morphologies, in which one kind of particles, an outer surface thereof composed of cellulose chain ends being a crystal plane perpendicular to a (112) zone axis, had a length L and a width W both between 3 and 10 nm and a height between 4 and 8 nm, and the other kind of particles, an outer surface thereof composed of cellulose chain ends is a crystal plane perpendicular to a (001) zone axis, had a length L between 20 nm and 100 nm, a width W between 30 nm and 80 nm and a height H between 3 nm and 6 nm.

Example 5

Step 1: Amorphization reconstitution of cellulose raw material: refined straw cellulose, obtained by subjecting straw to continuous reflux reaction through 5 wt % NaOH aqueous solution, 1 wt % HCl aqueous solution, and 1 wt % sodium hypochlorite aqueous solution sequentially, was used as a cellulose-containing raw material of the present disclosure. The cellulose-containing raw material was added to a solvent system composed of 8.3 wt % NaOH, 10 wt % urea and balance amount of water and stirred to obtain 50 g of 5 wt % straw cellulose solution. Isobutanol was added with stirring until cellulose was completely precipitated, and the amorphization reconstituted cellulose precipitated was washed with isobutanol and dried.

Step 2: Crystallization acidolysis of amorphization reconstituted cellulose: the amorphization reconstituted cellulose obtained in Step 1 was added to a mixed solution of water/isobutanol/sec-butanol. Perchloric acid was added to the solution to reach a concentration of 0.1 mol/L. The solution was heated and refluxed for 10 hours to obtain a cellulose II nanocrystal particle product.

With respect to the total amount of the cellulose raw material, the yield of the product was 92.3%. The product had a crystallinity of 95%, a number-average molecular weight of 1835, a molecular weight distribution coefficient Mw/Mn of 1.07, and cell parameters of a=8.1 Å, b=9.03 Å, c=10.31 Å, α=β=90°, and γ=117.1°. The morphologies thereof included two kinds of particulate morphologies, in which one kind of particles, an outer surface thereof composed of cellulose chain ends being a crystal plane perpendicular to a (112) zone axis, had a length L and a width W both between 3 and 10 nm and a height between 3 and 10 nm, and the other kind of particles, an outer surface thereof composed of cellulose chain ends being a crystal plane perpendicular to a (001) zone axis, had a length L between 20 nm and 100 nm, a width W between 30 nm and 80 nm and a height H between 3 nm and 10 nm.

Example 6

Step 1: Amorphization reconstitution of cellulose raw material: refined straw cellulose, obtained by subjecting straw to continuous reflux reaction through 5 wt % NaOH aqueous solution, 1 wt % HCl aqueous solution, and 1 wt % sodium hypochlorite aqueous solution sequentially, was used as a cellulose-containing raw material of the present disclosure. The cellulose-containing raw material was added to a solvent system composed of 8.3 wt % NaOH, 10 wt % urea and balance amount of water and stirred to obtain 50 g of 5 wt % straw cellulose solution. Tert-butanol was added with stirring until cellulose was completely precipitated, and the amorphization reconstituted cellulose precipitated was washed with tert-butanol and dried.

Step 2: Crystallization acidolysis of amorphization reconstituted cellulose: the amorphization reconstituted cellulose obtained in Step 1 was added to a mixed solution of water/tert-butanol/ethylene glycol. Hydrochloric acid was added to the solution to reach a concentration of 1 mol/L. The solution was heated and refluxed for 5 hours to obtain a cellulose II nanocrystal particle product.

With respect to the total amount of the cellulose raw material, the yield of the product was 91.5%. The product had a crystallinity of 91%, a number-average molecular weight of 1887, a molecular weight distribution coefficient Mw/Mn of 1.07, and cell parameters of a=8.1 Å, b=9.03 Å, c=10.31 Å, α=β=90°, and γ=117.1°. The morphologies thereof included two kinds of particulate morphologies, in which one kind of particles, an outer surface thereof composed of cellulose chain ends being a crystal plane perpendicular to a (112) zone axis, had a length L and a width W both between 3 and 10 nm and a height between 3 and 6 nm, and the other kind of particles, an outer surface thereof composed of cellulose chain ends being a crystal plane perpendicular to a (001) zone axis, had a length L between 20 nm and 100 nm, a width W between 30 nm and 80 nm and a height H between 5 nm and 10 nm.

Example 7

Step 1: Amorphization reconstitution of cellulose raw material: refined straw cellulose, obtained by subjecting straw to continuous reflux reaction through 5 wt % NaOH aqueous solution, 1 wt % HCl aqueous solution, and 1 wt % sodium hypochlorite aqueous solution sequentially, was used as a cellulose-containing raw material of the present disclosure. The cellulose-containing raw material was added to a solvent system composed of 8.3 wt % NaOH, 10 wt % urea and balance amount of water and stirred to obtain 50 g of 5 wt % straw cellulose solution. Isopropanol was added with stirring until cellulose was completely precipitated, and the amorphization reconstituted cellulose precipitated was washed with isopropanol and dried.

Step 2: Crystallization acidolysis of amorphization reconstituted cellulose: the amorphization reconstituted cellulose obtained in Step 1 was added to a mixed solution of water/tert-butanol. Hydrochloric acid was added to the solution to reach a concentration of 0.1 mol/L. The solution was heated and refluxed for 10 hours to obtain a cellulose II nanocrystal particle product.

With respect to the total amount of the cellulose raw material, the yield of the product was 85.9%. The product had a crystallinity of 89%, a number-average molecular weight of 1822, a molecular weight distribution coefficient Mw/Mn of 1.07, and cell parameters of a=8.1 Å, b=9.03 Å, c=10.31 Å, α=β=90°, and γ=117.1°. The morphologies thereof included two kinds of particulate morphologies, in which one kind of particles, an outer surface thereof composed of cellulose chain ends being a crystal plane perpendicular to a (112) zone axis, had a length L and a width W both between 3 and 10 nm and a height between 3 and 6 nm, and the other kind of particles, an outer surface thereof composed of cellulose chain ends being a crystal plane perpendicular to a (001) zone axis, had a length L between 20 nm and 100 nm, a width W between 30 nm and 80 nm and a height H between 5 nm and 10 nm.

Example 8

Step 1: Amorphization reconstitution of cellulose raw material: refined bamboo cellulose was obtained by subjecting bamboo fiber to continuous reflux reaction through 5 wt % NaOH aqueous solution, 1 wt % HCl aqueous solution, and 1 wt % sodium hypochlorite aqueous solution sequentially, and was used as a cellulose-containing raw material of the present disclosure. The cellulose-containing raw material was added to a solvent system composed of 7 wt % NaOH, 12 wt % urea and balance amount of water and stirred to obtain 50 g of 5 wt % bamboo cellulose solution. Ethanol was added with stirring until cellulose was completely precipitated, and the amorphization reconstituted cellulose precipitated was washed with ethanol and dried.

Step 2: Crystallization acidolysis of amorphization reconstituted cellulose: the amorphization reconstituted cellulose obtained in Step 1 was added to a mixed solution of water/dioxane. Hydrochloric acid was added to the solution to reach a concentration of 0.1 mol/L. The solution was heated and refluxed for 10 hours to obtain a cellulose II nanocrystal particle product.

With respect to the total amount of the cellulose raw material, the yield of the product was 93.6%. The product had a crystallinity of 95%, a number-average molecular weight of 1782, a molecular weight distribution coefficient Mw/Mn of 1.07, and cell parameters of a=8.1 Å, b=9.03 Å, c=10.31 Å, α=β=90°, and γ=117.1°. The morphologies thereof included two kinds of particulate morphologies, in which one kind of particles, an outer surface thereof composed of cellulose chain ends being a crystal plane perpendicular to a (112) zone axis, had a length L and a width W both between 3 and 10 nm and a height between 3 and 6 nm, and the other kind of particles, an outer surface thereof composed of cellulose chain ends being a crystal plane perpendicular to a (001) zone axis, had a length L between 20 nm and 100 nm, a width W between 30 nm and 80 nm and a height H between 5 nm and 10 nm.

Example 9

Step 1: Amorphization reconstitution of cellulose raw material: refined rice straw cellulose was obtained by subjecting rice straw to continuous reflux reaction through 5 wt % NaOH aqueous solution, 1 wt % HCl aqueous solution, and 1 wt % sodium hypochlorite aqueous solution sequentially, and was used as a cellulose-containing raw material of the present disclosure. The cellulose-containing raw material was added to a solvent system composed of 5 wt % NaOH, 16 wt % urea and balance amount of water and stirred to obtain 50 g of 5 wt % rice straw cellulose solution. Ethanol was added with stirring until cellulose was completely precipitated, and the amorphization reconstituted cellulose precipitated was washed with ethanol and dried.

Step 2: Crystallization acidolysis of amorphization reconstituted cellulose: the amorphization reconstituted cellulose obtained in Step 1 was added to a mixed solution of water/ethanol/ethylene glycol. Hydrochloric acid was added to the solution to reach a concentration of 0.1 mol/L. The solution was heated and refluxed for 10 hours to obtain a cellulose II nanocrystal particle product.

With respect to the total amount of the cellulose raw material, the yield of the product was 90.2%. The product had a crystallinity of 94%, a number-average molecular weight of 1458, a molecular weight distribution coefficient Mw/Mn of 1.06, and cell parameters of a=8.1 Å, b=9.03 Å, c=10.31 Å, $\alpha=\beta=90°$, and $\gamma=117.1°$. The morphologies thereof included two kinds of particulate morphologies, in which one kind of particles, an outer surface thereof composed of cellulose chain ends being a crystal plane perpendicular to a (112) zone axis, had a length L and a width W both between 3 and 10 nm and a height between 3 and 6 nm, and the other kind of particles, an outer surface thereof composed of cellulose chain ends being a crystal plane perpendicular to a (001) zone axis, had a length L between 20 nm and 100 nm, a width W between 30 nm and 80 nm and a height H between 5 nm and 10 nm.

Example 10

Step 1: Amorphization reconstitution of cellulose raw material: refined flax cellulose was obtained by subjecting flax to continuous reflux reaction through 5 wt % NaOH aqueous solution, 1 wt % HCl aqueous solution, and 1 wt % sodium hypochlorite aqueous solution sequentially, and was used as a cellulose-containing raw material of the present disclosure. The cellulose-containing raw material was added to a solvent system composed of 8.3 wt % NaOH, 10 wt % urea and balance amount of water and stirred to obtain 50 g of 5 wt % flax cellulose solution. Ethanol was added with stirring until cellulose was completely precipitated, and the amorphization reconstituted cellulose precipitated was washed with ethanol and dried.

Step 2: Crystallization acidolysis of amorphization reconstituted cellulose: the amorphization reconstituted cellulose obtained in Step 1 was added to a mixed solution of water/ethanol/ethylene glycol. Hydrochloric acid was added to the solution to reach a concentration of 0.1 mol/L. The solution was heated and refluxed for 10 hours to obtain a cellulose II nanocrystal particle product.

With respect to the total amount of the cellulose raw material, the yield of the product was 93.4%. The product had a crystallinity of 94%, a number-average molecular weight of 1863, a molecular weight distribution coefficient Mw/Mn of 1.07, and cell parameters of a=8.1 Å, b=9.03 Å, c=10.31 Å, $\alpha=\beta=90°$, and $\gamma=117.1°$. The morphologies thereof included two kinds of particulate morphologies, in which one kind of particles, an outer surface thereof composed of cellulose chain ends being a crystal plane perpendicular to a (112) zone axis, had a length L and a width W both between 3 and 10 nm and a height between 3 and 8 nm, and the other kind of particles, an outer surface thereof composed of cellulose chain ends being a crystal plane perpendicular to a (001) zone axis, had a length L between 20 nm and 100 nm, a width W between 30 nm and 80 nm and a height H between 3 nm and 10 nm.

Example 11

Step 1: Amorphization reconstitution of cellulose raw material: paper pulp was obtained by subjecting waste paper to a reflux reaction with 1 wt % sodium hypochlorite aqueous solution, and was used as a cellulose-containing raw material of the present disclosure. The cellulose-containing raw material was added to a solvent system composed of 8.3 wt % NaOH, 10 wt % urea and balance amount of water and stirred to obtain 50 g of 5 wt % cellulose solution. Ethanol was added with stirring until cellulose was completely precipitated, and the amorphization reconstituted cellulose precipitated was washed with ethanol and dried.

Step 2: Crystallization acidolysis of amorphization reconstituted cellulose: the amorphization reconstituted cellulose obtained in Step 1 was added to a mixed solution of water/ethanol/ethylene glycol. Hydrochloric acid was added to the solution to reach a concentration of 0.1 mol/L. The solution was heated and refluxed for 10 hours to obtain a cellulose II nanocrystal particle product.

With respect to the total amount of the cellulose raw material, the yield of the product was 96.6%. The product had a crystallinity of 93%, a number-average molecular weight of 1906, a molecular weight distribution coefficient Mw/Mn of 1.07, and cell parameters of a=8.1 Å, b=9.03 Å, c=10.31 Å, $\alpha=\beta=90°$, and $\gamma=117.1°$. The morphologies thereof included two kinds of particulate morphologies, in which one kind of particles, an outer surface thereof composed of cellulose chain ends being a crystal plane perpendicular to a (112) zone axis, had a length L and a width W both between 3 and 10 nm and a height between 3 and 6 nm, and the other kind of particles, an outer surface thereof composed of cellulose chain ends being a crystal plane perpendicular to a (001) zone axis, had a length L between 20 nm and 100 nm, a width W between 30 nm and 80 nm and a height H between 5 nm and 10 nm.

Example 12

Step 1: Amorphization reconstitution of cellulose raw material: cotton was used as a cellulose-containing raw material of the present disclosure. The cellulose-containing raw material was added to a solvent system composed of 8.3 wt % NaOH, 10 wt % urea and balance amount of water and stirred to obtain 50 g of 4 wt % cotton cellulose solution. Ethanol was added with stirring until cellulose was completely precipitated, and the amorphization reconstituted cellulose precipitated was washed with ethanol and dried.

Step 2: Crystallization acidolysis of amorphization reconstituted cellulose: the amorphization reconstituted cellulose obtained in Step 1 was added to a mixed solution of water/ethanol/ethylene glycol. Hydrochloric acid was added to the solution to reach a concentration of 0.1 mol/L. The solution was heated and refluxed for 10 hours to obtain a cellulose II nanocrystal particle product.

With respect to the total amount of the cellulose raw material, the yield of the product was 95.4%. The product had a crystallinity of 96%, a number-average molecular weight of 1833, a molecular weight distribution coefficient Mw/Mn of 1.07, and cell parameters of a=8.1 Å, b=9.03 Å, c=10.31 Å, α=β=90°, and γ=117.1°. The morphologies thereof included two kinds of particulate morphologies, in which one kind of particles, an outer surface thereof composed of cellulose chain ends being a crystal plane perpendicular to a (112) zone axis, had a length L and a width W both between 3 and 10 nm and a height between 3 and 6 nm, and the other kind of particles, an outer surface thereof composed of cellulose chain ends being a crystal plane perpendicular to a (001) zone axis, had a length L between 20 nm and 100 nm, a width W between 30 nm and 80 nm and a height H between 3 nm and 5 nm.

Example 13

Step 1: Amorphization reconstitution of cellulose raw material: bacterial cellulose was obtained by reacting Cystobacter with 1 wt % NaOH aqueous solution at 70° C., and was used as a cellulose-containing raw material of the present disclosure. The cellulose-containing raw material was added to a solvent system composed of 8.3 wt % NaOH, 10 wt % urea and balance amount of water and stirred to obtain 50 g of 5 wt % flax cellulose solution. Ethanol was added with stirring until cellulose was completely precipitated, and the amorphization reconstituted cellulose precipitated was washed with ethanol and dried.

Step 2: Crystallization acidolysis of amorphization reconstituted cellulose: the amorphization reconstituted cellulose obtained in Step 1 was added to a mixed solution of water/ethanol/ethylene glycol. Hydrochloric acid was added to the solution to reach a concentration of 0.1 mol/L. The solution was heated and refluxed for 10 hours to obtain a cellulose II nanocrystal particle product.

With respect to the total amount of the cellulose raw material, the yield of the product was 97.3%. The product had a crystallinity of 95%, a number-average molecular weight of 1315, a molecular weight distribution coefficient Mw/Mn of 1.04, and cell parameters of a=8.1 Å, b=9.03 Å, c=10.31 Å, α=β=90°, and γ=117.1°. The morphologies thereof included two kinds of particulate morphologies, in which one kind of particles, an outer surface thereof composed of cellulose chain ends being a crystal plane perpendicular to a (112) zone axis, had a length L and a width W both between 3 and 10 nm and a height between 3 and 6 nm, and the other kind of particles, an outer surface thereof composed of cellulose chain ends being a crystal plane perpendicular to a (001) zone axis, had a length L between 20 nm and 100 nm, a width W between 30 nm and 80 nm and a height H between 3 nm and 5 nm.

Example 14

Step 1: Amorphization reconstitution of cellulose raw material: refined alga cellulose was obtained by subjecting alga to continuous reflux extraction reaction through ethanol, 1 wt % HCl aqueous solution, 2 wt % NaOH aqueous solution, and 1 wt % sodium hypochlorite aqueous solution sequentially, and was used as a cellulose-containing raw material of the present disclosure. The cellulose-containing raw material was added to a solvent system composed of 8.3 wt % NaOH, 10 wt % urea and balance amount of water and stirred to obtain 50 g of 5 wt % rice straw cellulose solution. Methanol was added with stirring until cellulose was completely precipitated, and the amorphization reconstituted cellulose precipitated was washed with methanol and dried.

Step 2: Crystallization acidolysis of amorphization reconstituted cellulose: the amorphization reconstituted cellulose obtained in Step 1 was added to a mixed solution of water/ethylene glycol/methanol. Sulfuric acid was added to the solution to reach a concentration of 1 mol/L. The solution was heated and refluxed for 4 hours to obtain a cellulose II nanocrystal particle product.

With respect to the total amount of the cellulose raw material, the yield of the product was 86.9%. The product had a crystallinity of 96%, a number-average molecular weight of 1861, a molecular weight distribution coefficient Mw/Mn of 1.07, and cell parameters of a=8.1 Å, b=9.03 Å, c=10.31 Å, α=β=90°, and γ=117.1°. The morphologies thereof included two kinds of particulate morphologies, in which one kind of particles, an outer surface thereof composed of cellulose chain ends being a crystal plane perpendicular to a (112) zone axis, had a length L and a width W both between 3 and 10 nm and a height between 3 and 6 nm, and the other kind of particles, an outer surface thereof composed of cellulose chain ends being a crystal plane perpendicular to a (001) zone axis, had a length L between 20 nm and 100 nm, a width W between 30 nm and 80 nm and a height H between 3 nm and 5 nm.

Example 15

Step 1: Amorphization reconstitution of cellulose raw material: refined straw cellulose, obtained by subjecting straw to continuous reflux reaction through 5 wt % NaOH aqueous solution, 1 wt % HCl aqueous solution, and 1 wt % sodium hypochlorite aqueous solution sequentially, was used as a cellulose-containing raw material of the present disclosure. The cellulose-containing raw material was added to an aqueous solution of 86 wt % N-methylmorpholine-N-oxide and stirred to obtain 50 g of 5 wt % straw cellulose solution. Ethanol was added with stirring until cellulose was completely precipitated, and the amorphization reconstituted cellulose precipitated was washed with ethanol and dried.

Step 2: Crystallization acidolysis of amorphization reconstituted cellulose: the amorphization reconstituted cellulose obtained in Step 1 was added to a mixed solution of water/ethanol/ethylene glycol. Hydrochloric acid was added to the solution to reach a concentration of 0.1 mol/L. The solution was heated and refluxed for 10 hours to obtain a cellulose II nanocrystal particle product.

With respect to the total amount of the cellulose raw material, the yield of the product was 85.2%. The product had a crystallinity of 83%, a number-average molecular weight of 1370, a molecular weight distribution coefficient Mw/Mn of 1.20, and cell parameters of a=8.1 Å, b=9.03 Å, c=10.31 Å, α=β=90°, and γ=117.1°. The morphologies thereof included two kinds of particulate morphologies, in which one kind of particles, an outer surface thereof composed of cellulose chain ends being a crystal plane perpendicular to a (112) zone axis, with a length L and a width W both between 3 and 15 nm and with a height between 3 and 10 nm, and the other kind of particles, an outer surface thereof composed of cellulose chain ends being a crystal plane perpendicular to a (001) zone axis, had a length L between 20 nm and 100 nm, a width W between 30 nm and 80 nm and a height H between 3 nm and 10 nm.

Example 16

Step 1: Amorphization reconstitution of cellulose raw material: refined straw cellulose, obtained by subjecting straw to continuous reflux reaction through 5 wt % NaOH aqueous solution, 1 wt % HCl aqueous solution, and 1 wt % sodium hypochlorite aqueous solution sequentially, was used as a cellulose-containing raw material of the present disclosure. The cellulose-containing raw material was added to a solvent system composed of 6.7 wt % LiOH, 10 wt % urea and balance amount of water and stirred to obtain 50 g of 5 wt % straw cellulose solution. Ethanol was added with stirring until cellulose was completely precipitated, and the amorphization reconstituted cellulose precipitated was washed with ethanol and dried.

Step 2: Crystallization acidolysis of amorphization reconstituted cellulose: the amorphization reconstituted cellulose obtained in Step 1 was added to a mixed solution of water/ethanol/ethylene glycol. Hydrochloric acid was added to the solution to reach a concentration of 0.1 mol/L. The solution was heated and refluxed for 10 hours to obtain a cellulose II nanocrystal particle product.

With respect to the total amount of the cellulose raw material, the yield of the product was 93.1%. The product had a crystallinity of 91%, a number-average molecular weight of 1877, a molecular weight distribution coefficient Mw/Mn of 1.07, and cell parameters of a=8.1 Å, b=9.03 Å, c=10.31 Å, α=β=90°, and γ=117.1°. The morphologies thereof included two kinds of particulate morphologies, in which one kind of particles, an outer surface thereof composed of cellulose chain ends being a crystal plane perpendicular to a (112) zone axis, had a length L and a width W both between 3 and 10 nm and a height between 3 and 6 nm, and the other kind of particles, an outer surface thereof composed of cellulose chain ends being a crystal plane perpendicular to a (001) zone axis, had a length L between 20 nm and 100 nm, a width W between 30 nm and 80 nm and a height H between 5 nm and 10 nm.

Example 17

Step 1: Amorphization reconstitution of cellulose raw material: refined straw cellulose, obtained by subjecting straw to continuous reflux reaction through 5 wt % NaOH aqueous solution, 1 wt % HCl aqueous solution, and 1 wt % sodium hypochlorite aqueous solution sequentially, was used as a cellulose-containing raw material of the present disclosure. The cellulose-containing raw material was added to a solvent system composed of 8.3 wt % NaOH, 10 wt % thiourea and balance amount of water and stirred to obtain 50 g of 5 wt % straw cellulose solution. Ethanol was added with stirring until cellulose was completely precipitated, and the amorphization reconstituted cellulose precipitated was washed with ethanol and dried.

Step 2: Crystallization acidolysis of amorphization reconstituted cellulose: the amorphization reconstituted cellulose obtained in Step 1 was added to a mixed solution of water/ethanol/ethylene glycol. Hydrochloric acid was added to the solution to reach a concentration of 0.1 mol/L. The solution was heated and refluxed for 10 hours to obtain a cellulose II nanocrystal particle product.

With respect to the total amount of the cellulose raw material, the yield of the product was 93.2%. The product had a crystallinity of 92%, a number-average molecular weight of 1762, a molecular weight distribution coefficient Mw/Mn of 1.07, and cell parameters of a=8.1 Å, b=9.03 Å, c=10.31 Å, α=β=90°, and γ=117.1°. The morphologies thereof included two kinds of particulate morphologies, in which one kind of particles, an outer surface thereof composed of cellulose chain ends being a crystal plane perpendicular to a (112) zone axis, had a length L and a width W both between 3 and 10 nm and a height between 3 and 6 nm, and the other kind of particles, an outer surface thereof composed of cellulose chain ends being a crystal plane perpendicular to a (001) zone axis, had a length L between 20 nm and 100 nm, a width W between 30 nm and 80 nm and a height H between 5 nm and 10 nm.

Example 18

Step 1: Amorphization reconstitution of cellulose raw material: refined straw cellulose, obtained by subjecting straw to continuous reflux reaction through 5 wt % NaOH aqueous solution, 1 wt % HCl aqueous solution, and 1 wt % sodium hypochlorite aqueous solution sequentially, was used as a cellulose-containing raw material of the present disclosure. The cellulose-containing raw material was added to a solvent system composed of 7.2 wt % LiOH, 10 wt % thiourea and balance amount of water and stirred to obtain 50 g of 5 wt % straw cellulose solution. Ethanol was added with stirring until cellulose was completely precipitated, and the amorphization reconstituted cellulose precipitated was washed with ethanol and dried.

Step 2: Crystallization acidolysis of amorphization reconstituted cellulose: the amorphization reconstituted cellulose obtained in Step 1 was added to a mixed solution of water/ethanol/ethylene glycol. Hydrochloric acid was added to the solution to reach a concentration of 0.1 mol/L. The solution was heated and refluxed for 10 hours to obtain a cellulose II nanocrystal particle product.

With respect to the total amount of the cellulose raw material, the yield of the product was 92.5%. The product had a crystallinity of 91%, a number-average molecular weight of 1836, a molecular weight distribution coefficient Mw/Mn of 1.07, and cell parameters of a=8.1 Å, b=9.03 Å, c=10.31 Å, α=β=90°, and γ=117.1°. The morphologies thereof included two kinds of particulate morphologies, in which one kind of particles, an outer surface thereof composed of cellulose chain ends being a crystal plane perpendicular to a (112) zone axis, had a length L and a width W both between 3 and 10 nm and a height between 3 and 6 nm, and the other kind of particles, an outer surface thereof composed of cellulose chain ends being a crystal plane perpendicular to a (001) zone axis, had a length L between 20 nm and 100 nm, a width W between 30 nm and 80 nm and a height H between 5 nm and 10 nm.

Example 19

Step 1: Amorphization reconstitution of cellulose raw material: refined straw cellulose, obtained by subjecting straw to continuous reflux reaction through 5 wt % NaOH aqueous solution, 1 wt % HCl aqueous solution, and 1 wt % sodium hypochlorite aqueous solution sequentially, was used as a cellulose-containing raw material of the present disclosure. The cellulose-containing raw material was added to a solvent system composed of N,N-dimethyl acetamide containing 9 wt % LiCl and stirred to obtain 50 g of 5 wt % straw cellulose solution. Ethanol was added with stirring until cellulose was completely precipitated, and the amorphization reconstituted cellulose precipitated was washed with ethanol and dried.

Step 2: Crystallization acidolysis of amorphization reconstituted cellulose: the amorphization reconstituted cellulose obtained in Step 1 was added to a mixed solution of water/ethanol/ethylene glycol. Hydrochloric acid was added to the solution to reach a concentration of 0.1 mol/L. The solution was heated and refluxed for 10 hours to obtain a cellulose II nanocrystal particle product.

With respect to the total amount of the cellulose raw material, the yield of the product was 92.7%. The product had a crystallinity of 93%, a number-average molecular weight of 1745, a molecular weight distribution coefficient Mw/Mn of 1.07, and cell parameters of a=8.1 Å, b=9.03 Å, c=10.31 Å, $\alpha=\beta=90°$, and $\gamma=117.1°$. The morphologies thereof included two kinds of particulate morphologies, in which one kind of particles, an outer surface thereof composed of cellulose chain ends being a crystal plane perpendicular to a (112) zone axis, had a length L and a width W both between 3 and 10 nm and a height between 3 and 6 nm, and the other kind of particles, an outer surface thereof composed of cellulose chain ends being a crystal plane perpendicular to a (001) zone axis, had a length L between 20 nm and 100 nm, a width W between 30 nm and 80 nm and a height H between 5 nm and 10 nm.

Example 20

Step 1: Amorphization reconstitution of cellulose raw material: refined straw cellulose, obtained by subjecting straw to continuous reflux reaction through 5 wt % NaOH aqueous solution, 1 wt % HCl aqueous solution, and 1 wt % sodium hypochlorite aqueous solution sequentially, was used as a cellulose-containing raw material of the present disclosure. The cellulose-containing raw material was added to a solvent system composed of N,N-dimethyl formamide containing 10 wt % LiBr and stirred to obtain 50 g of 5 wt % straw cellulose solution. Ethanol was added with stirring until cellulose was completely precipitated, and the amorphization reconstituted cellulose precipitated was washed with ethanol and dried.

Step 2: Crystallization acidolysis of amorphization reconstituted cellulose: the amorphization reconstituted cellulose obtained in Step 1 was added to a mixed solution of water/ethanol/ethylene glycol. Hydrochloric acid was added to the solution to reach a concentration of 0.1 mol/L. The solution was heated and refluxed for 10 hours to obtain a cellulose II nanocrystal particle product.

With respect to the total amount of the cellulose raw material, the yield of the product was 91.5%. The product had a crystallinity of 94%, a number-average molecular weight of 1893, a molecular weight distribution coefficient Mw/Mn of 1.07, and cell parameters of a=8.1 Å, b=9.03 Å, c=10.31 Å, $\alpha=\beta=90°$, and $\gamma=117.1°$. The morphologies thereof included two kinds of particulate morphologies, in which one kind of particles, an outer surface thereof composed of cellulose chain ends being a crystal plane perpendicular to a (112) zone axis, had a length L and a width W both between 3 and 10 nm and a height between 3 and 6 nm, and the other kind of particles, an outer surface thereof composed of cellulose chain ends being a crystal plane perpendicular to a (001) zone axis, had a length L between 20 nm and 100 nm, a width W between 30 nm and 80 nm and a height H between 5 nm and 10 nm.

The cellulose II nanocrystal particle products obtained in the above Examples 1-20 were determined by a silver-ammonia solution method. Results showed that all the cellulose II nanocrystal particles obtained in the present disclosure had active aldose groups. After analysis, these active aldose groups are located on a crystal plane perpendicular to the (001) zone axis or a crystal plane perpendicular to the (112) zone axis, said crystal plane being composed of cellulose chain ends.

The results of above examples indicate that the cellulose II nanocrystal particles according to the present disclosure have advantages of high crystallinity, low molecular weight, narrow molecular weight distribution, narrow size distribution, complete crystal structure, definite surface structure, high surface chemistry modification potential and so on, and can be used for applications such as catalyst support and composite material reinforcement phase.

What is claimed is:

1. Cellulose II nanocrystal particles, wherein the cellulose II nanocrystal particles have a crystallinity ≥80%, a number-average molecular weight ranging from 1200 to 2500, and a molecular weight distribution coefficient Mw/Mn≤1.30.

2. The cellulose II nanocrystal particles according to claim 1, wherein the cellulose II nanocrystal particles have cell parameters of a=8.1 Å, b=9.03 Å, c=10.31 Å, $\alpha=\beta=90°$, and $\gamma=117.1°$.

3. The cellulose II nanocrystal particles according to claim 1, wherein an outer surface of the cellulose II nanocrystal particles which is composed of cellulose chain ends is a crystal plane perpendicular to a (001) zone axis, or a crystal plane perpendicular to a (1(−)12) zone axis, wherein a length and a width of the outer surface define a length L and a width W of the cellulose II nanocrystal particles, and a size perpendicular to the outer surface defines a height H of the cellulose II nanocrystal particles.

4. The cellulose II nanocrystal particles according to claim 3, wherein the aldose activity is present on the crystal plane perpendicular to the (001) zone axis or the crystal plane perpendicular to the (1(−)12) zone axis composed of the cellulose chain ends.

5. The cellulose II nanocrystal particles according to claim 3, wherein the outer surface of the cellulose II nanocrystal particles which is composed of cellulose chain ends is the crystal plane perpendicular to the (1(−)12) zone axis, wherein each of the length L and the width W of the cellulose II nanocrystal particles is between 3 nm and 20 nm, and the height H is between 3 nm and 10 nm.

6. The cellulose II nanocrystal particles according to claim 3, wherein the outer surface of the cellulose II nanocrystal particles which is composed of cellulose chain ends is the crystal plane perpendicular to the (001) zone axis, wherein each of the length L and the width W of the cellulose II nanocrystal particles is between 15 nm and 200 nm, and the height H is between 2 nm and 10 nm.

7. The cellulose II nanocrystal particles according to claim 1, wherein the cellulose II nanocrystal particles are monocrystalline particles.

8. A method for preparing the cellulose II nanocrystal particles according to claim 1, comprising:
   Step 1: dissolving a cellulose-containing raw material to obtain a cellulose solution, and mixing the cellulose solution with a poor solvent to precipitate the dissolved cellulose from the poor solvent so as to obtain amorphization reconstituted cellulose; and
   Step 2: adding the amorphization reconstituted cellulose obtained in Step 1 to a mixed solution of water/organic solvent, adding an inorganic acid to adjust acidity, and heating the solution to carry out a reaction, so as to obtain the cellulose II nanocrystal particles.

9. The method according to claim 8, wherein the yield is higher than 80% based on the total weight of the cellulose raw material.

10. The method according to claim 8, wherein in Step 1, the cellulose-containing raw material is a refined cellulose or cellulose slurry isolated from plants, animals, algae or bacteria.

11. The method according to claim 8, wherein in Step 1, the solvent for dissolving the cellulose-containing raw material is one or more selected from the group consisting of sodium hydroxide/urea/water, lithium hydroxide/urea/water, sodium hydroxide/thiourea/water, lithium hydroxide/thiourea/water, N-methylmorpholine-N-oxide/water, N,N-dimethyl acetamide/LiCl, and N,N-dimethyl formamide/LiBr.

12. The method according to claim 8, wherein in Step 1, the poor solvent is one or more selected from the group consisting of water, alcohols, ketones, esters, ethers, aromatic hydrocarbons, and alkanes solvents.

13. The method according to claim 12, wherein in Step 1, the poor solvent is one or more selected from the group consisting of methanol, ethanol, n-propanol, isopropanol, sec-butanol, tert-butanol, ethylene glycol, glycerol, and acetone.

14. The method according to claim 8, wherein in Step 2, the organic solvent is one or more selected from the group consisting of alcohols, ethers, ketones, esters, N,N-dimethyl formamide, N,N-dimethyl acetamide, dimethyl sulfoxide, tetrahydrofuran, and 1,4-dioxane.

15. The method according to claim 14, wherein in Step 2, the organic solvent is one or more selected from the group consisting of methanol, ethanol, isopropanol, isobutanol, sec-butanol, tert-butanol, ethylene glycol, glycerol, and acetone, or the organic solvent is tetrahydrofuran and/or 1,4-dioxane, or the organic solvent is acetone and/or ethyl acetate.

16. The method according to claim 8, wherein in Step 2, the inorganic acid is one or more selected from the group consisting of hydrochloric acid, sulfuric acid, phosphoric acid, perchloric acid, and hydrobromic acid.

17. The method according to claim 8, wherein in Step 2, the concentration of the inorganic acid is 0.01-5 mol/L.

18. The method according to claim 17, wherein in Step 2, the concentration of the inorganic acid is 0.1-2 mol/L.

19. The method according to claim 8, further comprising washing the cellulose II nanocrystal particles obtained in Step 2 and storing the washed cellulose type II nanocrystal particles in wet state.

20. A catalyst support or a composite material reinforcement phase comprising the cellulose type II nanocrystal particles according to claim 1.

* * * * *

UNITED STATES PATENT AND TRADEMARK OFFICE
CERTIFICATE OF CORRECTION

PATENT NO. : 11,149,095 B2
APPLICATION NO. : 16/475921
DATED : October 19, 2021
INVENTOR(S) : Jinsong Zhang et al.

It is certified that error appears in the above-identified patent and that said Letters Patent is hereby corrected as shown below:

On the Title Page

In Column 2, item (56), Other Publications, Line 2, delete "cellulosenanocrystals" and insert --cellulose nanocrystals--.

In the Specification

In Column 3, Line 9 (approx.), delete "Mw/Mn≦≦1.10." and insert --Mw/Mn≤1.10.--.

Signed and Sealed this
Twenty-sixth Day of April, 2022

Katherine Kelly Vidal
*Director of the United States Patent and Trademark Office*